US006968031B2

(12) United States Patent
Hinshaw

(10) Patent No.: US 6,968,031 B2
(45) Date of Patent: Nov. 22, 2005

(54) RAY-BY-RAY FOURIER IMAGE RECONSTRUCTION FROM PROJECTIONS

(76) Inventor: Waldo S. Hinshaw, 164 Chapin La., Burlingame, CA (US) 94010

( * ) Notice: Subject to any disclaimer, the term of this patent is extended or adjusted under 35 U.S.C. 154(b) by 24 days.

(21) Appl. No.: 10/709,002

(22) Filed: Apr. 6, 2004

(65) Prior Publication Data

US 2005/0226362 A1 Oct. 13, 2005

(51) Int. Cl.[7] .................................................. A61B 6/03
(52) U.S. Cl. ............................. 378/8; 378/15; 378/901
(58) Field of Search ............................ 378/4, 8, 15, 19, 378/901

(56) References Cited

U.S. PATENT DOCUMENTS

2003/0161526 A1 * 8/2003 Jupiter et al. ............... 382/154

* cited by examiner

*Primary Examiner*—David V Bruce

(57) ABSTRACT

Two-dimensional or three-dimensional images of the distribution of a property of an object are formed by passing rays of radiation through the object and detecting how much each ray is attenuated. The Fourier transform is taken of each individual ray but only the zeroth term of the transform along the path of the ray is retained. Each of these transforms is added into a two or thee-dimensional array. If the three-dimensional distribution is being imaged, the transform is a plane of numbers, which is added into the three-dimensional array at right angles to the path of the ray. The numbers in the array are corrected for the non-uniform density of data. After enough such rays in enough different directions are applied, the distribution of the property is obtained by taking the inverse Fourier transform of the data in the array.

21 Claims, 3 Drawing Sheets

RAY-BY-RAY FOURIER IMAGE RECONSTRUCTION FROM PROJECTIONS

BACKGROUND OF INVENTION

During the last few decades, methods have been developed for reconstructing the spatial distribution of an internal property of an object by acquiring multiple projections of that property and then combining them using a reconstruction algorithm. Although there are various applications of these methods, the medical imaging system using x-rays and computed tomography, the CT scanner, is perhaps the best known. The CT scanner typically obtains the distribution of attenuation in a two-dimensional slice of the object by taking projections through 180 degrees around the slice. However, reconstruction methods also can work in three dimensions. For a three-dimensional reconstruction, projections would be taken over a hemisphere.

The earliest and most often used CT algorithm is commonly known as filtered back projection, or simply FBP. A set of parallel x-rays is sent through a selected slice of the object in the plane of the slice and in a given direction. The attenuation as a function of position across the slice is the one-dimensional projection, or projection function, of the slice. Such projections are obtained for many different directions around the slice giving a set of edge-on projections. The resulting projections of the slice are stored in a computer memory. These projection functions are projected back through a numerical array in the same direction in which they were acquired. Before each function is back-projected, it is filtered by convolving it with a 1/r factor. The result of this process is a two-dimensional image of the distribution of the x-ray attenuation within the selected slice.

A second method for reconstruction from projections, called the Fourier method, is based on Fourier transforms and the Projection-Slice Theorem. With this method, the projections of a slice are obtained as described above. Then the projection functions are Fourier transformed and the transforms are placed as a line of numbers into a two-dimensional numerical array here called F-space. For each projection direction, the corresponding line of numbers goes into F-space through the origin and at right angles to the direction of the projection. When F-space is fully populated and the data has been modified or "filtered", an inverse Fourier transform of the data in F-space is performed in order to produce the desired distribution of the slice.

In this discussion, the term Fourier transform also includes any similar transform that converts one function into a summation of a series of periodic functions. In very general terms, the Fourier transform takes a first function from a first n-dimensional space, alters it, and puts it into a second n-dimensional space as a second function. This can be accomplished by taking the first function element-by-element, altering each element, and then adding each altered element to the other altered elements in the second space. As an example, if the first function is a one-dimensional array of numbers, then for each of the numbers, a sinusoid, a periodic function, is added into a second one-dimensional array. The amplitude of the sinusoid is proportional to the number and the frequency of the sinusoid is proportional to the location of the number in the input array. With Fourier transforms, these sinusoids are added together as an integral part of the transform process.

For two-dimensional reconstructions, the Projection-Slice Theorem states that the Fourier transform of an edge-on projection of the distribution of a property in a two-dimensional slice of an object is the same as a line of data extracted from the two-dimensional Fourier transform of the distribution, said extracted line being through the origin of the transform and perpendicular to the direction of the projection. For three-dimensional reconstructions, the Projection-Slice Theorem states that the Fourier transform of a projection of the distribution of a property in an object is the same as a plane of data extracted from the three-dimensional Fourier transform of the distribution of the property within the object, said extracted plane being through the origin of the transform and perpendicular to the direction of the projection.

With the Fourier method, the Fourier transform of each projection, whether a one-dimensional projection or a two-dimensional projection, is loaded into F-space as prescribed by the Projection-Slice Theorem. Usually enough projection directions are used so that F-space is filled with data. Since all of the transforms go through the origin of F-space, the data is denser there. Some mechanism, such as multiplying the amplitudes by the distance from the origin, is used to compensate for this non-uniform data density. The distribution of the object is obtained by taking the inverse Fourier transform of the data in F-space.

Both of the methods outlined above require that the rays used for each projection be parallel. The earliest CT scanners had a complex mechanical arrangement that translated a single ray resulting from a single source and a single detector across the object. It then rotated the ray to a different orientation and translated the ray across the object again. In this way, it generated a set of projections each obtained with parallel rays. But it is much more efficient to use more than one ray from the x-ray source. Later CT scanners use divergent x-ray beams, called fan-beams, and an arc or ring of detector elements. Since the rays are no longer parallel, more complex reconstruction methods have to be used. Typically, with planar imaging using fan-beams, the attenuation numbers are collected from all of the rays from all of the projections and then resorted, a process called re-binning, into sets that come from parallel rays. This provides parallel-ray projections. Once re-binning is done, the usual FBP or Fourier reconstruction algorithms can be employed.

In order to become even more efficient, multiple detector rings and two-dimensional detector arrays have come to be used. The divergent x-ray geometry is called cone-beam geometry. When the multiple detector rings are close together and the rays do not spread too much, modified fan-beam type reconstruction algorithms can be used without significant image artifacts. The most often used algorithms are modifications of FBP. Other algorithms have been proposed but are too complex for efficient implementation or produce images with unacceptable artifacts.

With the above CT methods, the x-ray source rotates in a circle around the object taking fan-beam or cone-beam projections. Then the object is advanced along the axis of the system and the process repeated. In order to become even more efficient, recent systems move the object along the axis smoothly as the source continues to rotate. X-ray attenuation numbers are obtained from the two-dimensional array of detector elements as this process continues. This is called helical CT. With this geometry, the reconstruction algorithms become even more difficult. Most such algorithms work by choosing sets of source and detector locations so that approximations to fan-beams are obtained and then, for each such set, modified FBP algorithms are used.

As the geometry has gone from fan-beams to cone-beams to helical cone-beams, the need for a general and efficient reconstruction algorithm that can handle divergent beams and complex geometries has become urgent. The present invention provides a method that answers that need.

SUMMARY OF INVENTION

This invention is a general method for obtaining the internal distribution of a property of an object by passing beams of energy through the object and measuring how much each beam, or ray, is attenuated by the object. The method provides an algorithm for generating an image of the distribution of the property from the observed attenuations of the rays. The method is generally applicable to any form of energy that can pass through objects in straight lines with attenuation by the object. The method also is applicable to imaging systems that provide projections of a property of an object.

This invention introduces a generalization or modification of the Fourier transform. The usual Fourier transform takes a function from a first n-dimensional space and, for each element of the function, adds an n-dimensional sinusoidal function into a second n-dimensional space. This invention, however, takes a function from an n-dimensional space and, for each element of the function, adds an n-dimensional sinusoidal function into a space of n+1 dimensions in a specified location.

This invention is different from the well-known Fourier reconstruction method. The Fourier method takes a projection of an object in n-dimensional space, where n is two or three, Fourier transforms the projection, which has n−1 dimensions, and puts the resulting transform into a second n-dimensional space in a location that depends upon the orientation of the projection. This invention, however, takes a projection of an object in n-dimensional space, where n is two or three, and for each ray of the projection adds a sinusoidal function of n−1 dimensions into a second space of n dimensions in a location that depends upon the orientation of the ray.

This invention, the ray-by-ray reconstruction method, or simply the RbR method, takes a projection of an object in n-dimensional space, where n is two or three, and for each ray of the projection adds a sinusoidal function of n−1 dimensions, called the F-component, into a space of n dimensions, called the F-space, in a location that depends upon the orientation of the ray. If n is two, the projection is a one-dimensional array of numbers. For each of the numbers in the array, a one-dimensional line of numbers with a sinusoidal modulation is added into a two-dimensional array at a specified location. However, if n is three, the projection is a two-dimensional array of numbers. For each of the numbers in the array, a two-dimensional plane of numbers with a sinusoidal modulation is added into a three-dimensional array at a specified location.

It is clear from the above that the RbR method is significantly different from the Fourier reconstruction method. However, if the projections are from sets of parallel rays, the RbR method gives the same result as the Fourier method. For parallel rays, the RbR method superimposes and adds together the F-components in F-space resulting in the same Fourier transform of the projection in the same location as that provided by the Fourier method. Thus for parallel-ray projections, the process is different but the results are similar.

The RbR method does not require parallel rays. The RbR method imposes no constraints on the location of the rays through the object other than that enough rays with enough locations are used to obtain sufficient data for the desired images. The term "location" is used to include both the translational position and the orientation of the ray in the object. One requirement on the locations of the rays is that F-space be fully populated to the extend required by the desired image. A second requirement on the locations of the rays is that they be uniformly distributed, both in translational position and in orientation. The strictness of this requirement is determined by the desired resolution and level of artifacts in the image. The traditional concept of a projection assumed that the rays that provide the projection are parallel. The knowledge that it is possible to reconstruct the distribution of a property of an object was based on parallel ray projections. In the recent literature, the term "projection" is used to include the functions provided by the divergent rays of fan-beams and cone-beams. The term "projection" as used in this disclosure is even more general and includes any grouping of rays through the object.

In order to construct a digital representation, or image, of the property A(x,y,z) from projections, the object is exposed to rays from many different directions. The requirements are based on the desired resolution and desired absence of artifacts. An intuitive feeling for what is required can be obtained by considering a set of rays that effectively sum a property of an object as they pass through it. For example, the intensity of an x-ray that has passed through an object the summation, or integral, of a measure of the attenuation of the object. So obtaining the distribution of the attenuation within the object by passing x-rays through it is similar to determining the numbers in a two-dimensional array of numbers on a sheet of paper by taking the sums of the numbers in different directions. Taking the sums of the rows and columns of a square 2 by 2 array of numbers provides enough information for determining the numbers in the array. But there would not have been enough information to determine the distribution if the array had been 3 by 3. "Magic Squares", for example, have the same sums for all rows and columns. But if sums are taken in enough different directions, the distribution can be reconstructed. Generally speaking, N equally spaced projection directions are needed, each containing N rays, or "ray-sums", in order to determine the distribution in an N by N array of numbers. The measurement process can be viewed as obtaining a set of linear equations. Each ray through the array provides the sum of all of the numbers it hits. If equally-spaced parallel ray-sums are taken at equally spaced angles around the array, it seems intuitively correct that N squared equations are necessary and sufficient for solving the problem. It also seems intuitively correct that each number in the array should be "interrogated" by a ray from every direction.

The Fourier reconstruction method requires that the rays be parallel and equally spaced in order to obtain a useful Fourier transform of the projection and that the projection directions be equally spaced in order to obtain a useful reconstruction. With this invention, the information provided by a ray through the object in any location can be separately loaded into F-space. However, unless corrections are made for non-uniform input data, it still is necessary, in order to minimize artifacts in the final image, to distribute the rays with some degree of uniformity over the object. That this is necessary is intuitively obvious from the previous paragraph. If the ray-sums are over a narrow range of angles or if the ray-sums are bunched on one side of the array, inadequate information will be obtained.

The following development of the equations for the method assumes a three-dimensional object rather than a slice. The equivalent equations for the case of two-dimensions is easily obtained by deleting the third dimension.

In order to develop an expression for the F-component of a given ray, consider an object with a property A(x,y,z). Define a line, or ray, through the object using the three parametric equations x=ar+b, y=cr+d, and z=er+f with r being the distance along the line. The property along this line, G(x,y,z), can be written $G(x,y,z)=A(x,y,z)\delta(x-ar-b)\delta(y-cr-d)\delta(z-er-f)$ where the delta function $\delta(x)$ equals unity if x=0 and is zero other-wise. Note that it is not necessary to assume a thin line as is done here. The same development can proceed under the assumption of finite width and even under the assumption of cone-shaped rays or rays of other shapes. The Fourier transform F(u,v,w) of G(x,y,z) can be written $$F(u,v,w)=\int_{-\infty}^{\infty}\int_{-\infty}^{\infty}\int_{-\infty}^{\infty}G(x,y,z)\exp[i(ux+vy+wz)]\,dx\,dy\,dz$$

Inserting the above expression for G(x,y,z) gives $$F(u,v,w)=\exp[i(bu+dv+fw)]\int A(r)\exp[i(au+cv+ew)r]\,dr$$

The second of the two factors in this equation is the one-dimensional Fourier transform of A(r), the property of the object as a function of distance along the line. However, projection measurements provide only the integral of A(r) over r, which corresponds to the zero-frequency term in the above integral. In other words, the only available information is when au+cv+ew=0. But the equation au+cv+ew=0 defines a plane that goes through the origin of F-space and which is orthogonal to the direction of the line. Within that plane, the numbers are given by F(u,v,w)=A exp[i(bu+dv+fw)], the modulation function, which is a space-filling sinusoid with frequency and orientation that depend upon the three parameters, b, d, and f. Since, from this ray, nothing is known about the other points in F-space, no numbers are loaded into F-space outside of the selected plane. This plane of numbers is the F-component of the ray. In this development, the F-component is expressed by two equations, one giving the location and the other giving the modulation. Since the modulation function is a sinusoid, the numbers on the F-component plane constitute a two-dimensional sinusoid.

The above result for the F-component can be derived in various ways and can be expressed in various ways. For example, an expression can be derived for the values of the modulation function on the F-component plane. As another example, the F-component can be expressed in terms of the two end-points of the ray. To do this, take the location of the source of a ray to be at $(X_S,Y_S,Z_S)$ and the location of the detector element measuring the ray to be at $(X_D,Y_D,Z_D)$. If r=0 is taken at the source and r=R at the detector, then at the source $X_S=b$, $Y_S=d$, $Z_S=f$ and at the detector $X_D=aR+b$, $Y_D=cR+d$, $Z_D=eR+f$. Combining these, we have $X_D-X_S=aR$, $Y_D-Y_S=cR$, and $Z_D-Z_S=eR$. The equation in the previous paragraph for the location of the F-component plane becomes $$(X_D-X_S)u+(Y_D-Y_S)v+(Z_D-Z_S)w=0$$

and the modulation function becomes $$F(u,v,w)=A\exp[i(X_Su+Y_Sv+Z_Sw)]$$

The fact that this equation for the modulation function is independent of the location of the detector can provide for computational efficiency in a specific implementation. Excluding the amplitude, the same modulation function applies to all of the rays in a single cone-beam. On the other hand, if r=0 is taken at the detector and r=R at the source, the location of the F-component does not change but the equation for the modulation function becomes $$F(u,v,w)=A\exp[i(X_Du+Y_Dv+Z_Dw)]$$

which is independent of the source location, which may be advantageous in some implementations.

From the known location and observed intensity of each ray, the F-component of each ray is determined according to the equations derived above. The F-components are "stuffed" into F-space. Since the data consists of discrete numbers and since, in most cases, the F-component numbers do not fall exactly on the locations of the F-space array points, a process is required to adjust the locations and values of the F-component numbers in order to add them into the F-space array. "Stuffing" is a more accurate term for the process than the customary term "re-binning" which refers to the process used in earlier fan-beam CT algorithms.

The coordinate system for F-space can be Cartesian, polar, any other convenient system. With some simple data collection geometries, for example two-dimensional single-slice fan-beam data collection, it might be convenient to use a polar coordinate system for F-space. However, for many embodiments, a Cartesian coordinate system is appropriate.

Once F-space is populated, a ramp function is applied to the amplitudes in order to correct for the fact that there are more data points near the origin of F-space than away from the origin. Since the F-components go through the origin of F-space, the density of data is greater there. This correction also is necessary in the Fourier method and is roughly equivalent to the filtering of FBP. Since the data is added into F-space and since, in practice, F-space is a discrete array, the fact that the data is denser near the origin means that the amplitudes tend to be greater near the origin. Thus the correction can be effected simply by multiplying the numbers by a "ramp" function. In most cases, for two-dimensional data, multiply each number by its distance from the origin and for three-dimensional data, multiply each number by the square of its distance from the origin. Corrections for other data non-uniformity and other corrections can be made to the data. Also, the data within F-space may be manipulated as is done with other Fourier imaging methods. For example, further decreasing the amplitudes of the numbers near the origin serves as a high-pass spatial filter for the final image.

The digital representation of the object, or image, is obtained by applying a Fourier transform to the data in F-space.

The mathematical development above outlines the calculation most suited to practical implementation. Based on these calculations, it is possible to calculate the contribution that each ray makes to the final image. In fact, it is possible to design a system that adds the contribution of each ray into the final image without going through the steps of loading the F-component of the ray into F-space. However, practical applications usually require consideration of calculation efficiency. And in most cases, it is more efficient to add the F-components into F-space and then take the Fourier transform of the combined data.

The RbR method has the feature that the data from each source location can be processed and loaded into F-space as soon as it is available without waiting for all of the data to be available. Thus the data processing can be underway as the data is being collected. After all of the data is collected, the final Fourier transform that creates the image is performed.

DETAILED DESCRIPTION

The RbR method can be applied equally well to a wide range of imaging technologies and, in particular, to any of the several ways in which cone-beams are used in CT, including helical scanning and tomosynthesis. The following embodiment shows how to apply the invention to one specific geometry that incorporates x-rays and cone-beam geometry. The following geometry has a fixed cylinder of detector elements and a single rotating source that provides a cone-beam of x-rays. The geometry will be described with reference to the drawings.

Figure 1A:
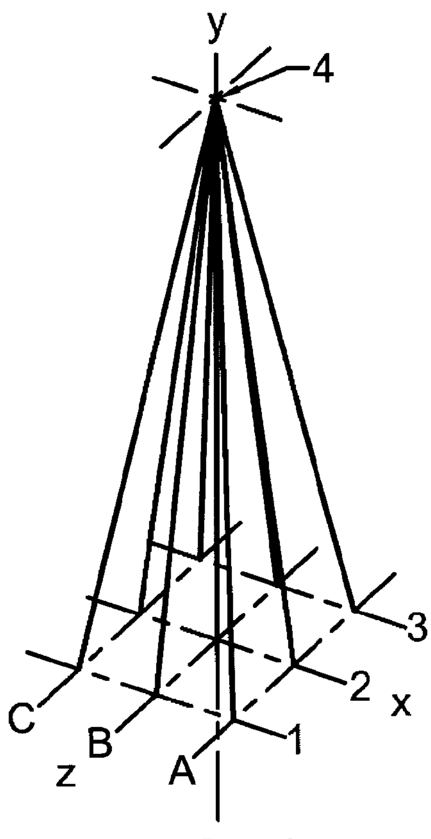
FIG. 1*a* shows a simple cone beam consisting of nine rays with the source at the top and a flat array of detector elements at the bottom.
Figure 1B:
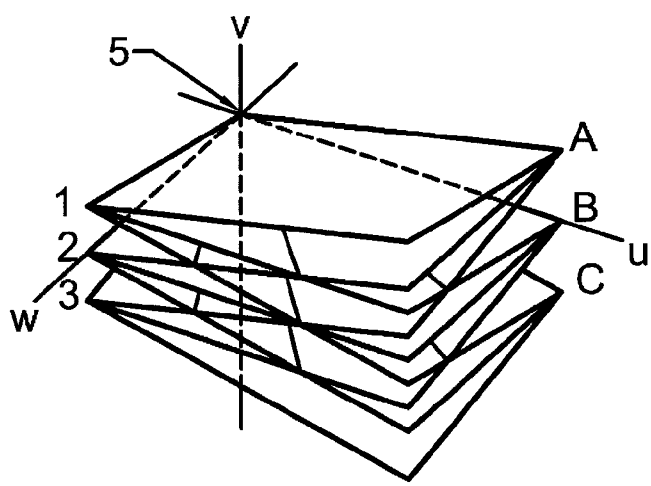
FIG. 1*b* shows the corresponding F-component planes in F-space.

FIG. 1*a* shows a very simple cone-beam consisting of nine rays arranged in three rows 1, 2, 3 parallel to the x-axis and three columns A, B, C parallel to the z-axis. The three rays in row 2 are on the x-axis and the three rays in column B are on the z-axis. The source 4 and the ray at the intersection of row 2 and column B, or ray 2B, are both on the z-axis. FIG. 1*b* shows the nine corresponding F-component planes in F-space. For example, the corner ray 1C corresponds to and is orthogonal to the one plane with corners at 1 and C, or plane 1C. For simplicity, only one quadrant is shown. Note that all F-component planes go through the origin 5 of F-space. Also note that the F-component planes intersect at some places. For example, planes 2A and 1B intersect.

FIG. 1*b* illustrates a unique and important feature of this invention. The data from a divergent set of rays goes into F-space, not as a single plane, but as a group of planes each with a different orientation. This is in contrast to the situation where the rays are not divergent. If each ray had a separate source so that the rays were parallel, then the F-component planes, being orthogonal to the rays, would lie in the same plane. Since each plane is added into F-space, if the rays were parallel, the one resulting plane in F-space would be simply the Fourier transform of the parallel-ray projection of the object. During a typical measurement, many different orientations of the cone are used and, as a result, F-space fills up as other F-component planes are added into it.

The specific embodiment used to illustrate this invention is a CT scanner with a rotating x-ray source supplying a cone-beam of rays to a cylindrical array of stationary detectors. Although the data from the rays in the central plane are the same as those in a single-slice fan-beam system, the rays tilted away from the central plane provide data that is substantially different. The current invention enables the data from these tilted rays to be placed into F-space without error.

Figure 2:
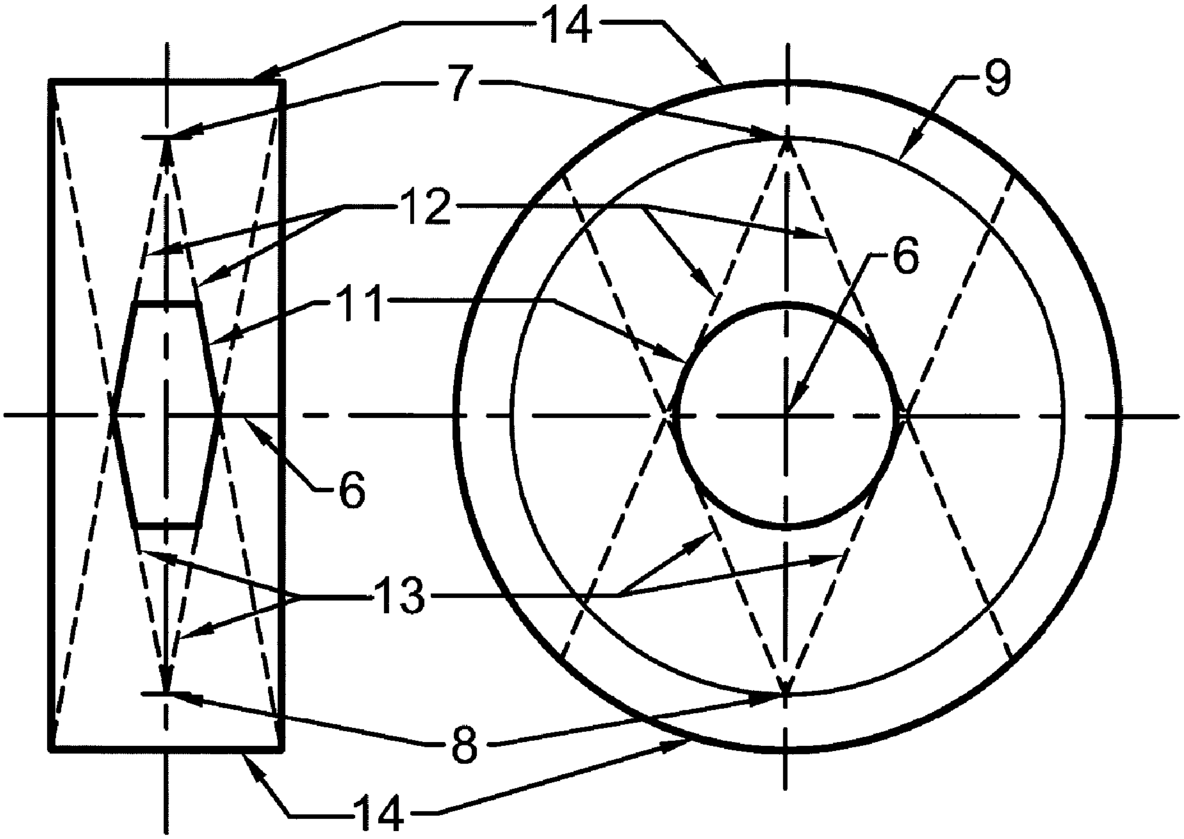
FIG. 2 is a pair of schematic views of a cone-beam CT scanner with the left part of the figure showing the side of the CT scanner and the right part showing the end of the same scanner looking along the axis.

FIG. 2 shows two orthogonal views of the assumed geometry. The left of FIG. 2 is the side view and the right of FIG. 2 looks in the direction of the axis 6 of the scanner. The source is shown at two locations, at the top 7 and at the bottom 8 of the path 9 it travels as it goes around the object. The dashed lines 12 are the outside edges of the cone of x-rays when the source is at the top 7. The dashed lines 13 are the outside edges of the cone of x-rays when the source is at the bottom 8. The array of detector elements 14 forms a cylinder that is concentric with the axis 6 of the scanner. The entire object is located within the central volume 11. The cone fully covers the central volume 11 at every source location. The region that is outside of the central volume 11 but which still can be hit by a ray within a cone for at least one source location is called the penumbra.

Cone beam geometry has problems with long objects, objects that extend into the penumbra where the object is not sampled enough to provide artifact-free reconstruction regardless of the method used for reconstruction. One way to minimize the artifacts from the material in the penumbra is to keep collecting data as the object is translated down the axis, ether step-wise or continually. Another is to stack a pair of half cone-beam acquisitions and take data from the central plane of one to the central plane of the other. For simplicity, the current embodiment assumes the entire object is within the central volume and nothing is in the penumbra. The cone can be collimated so that no ray misses the central volume. Further, no detector element is active that is not "shaded" by this volume. As a result, the cone does not have a rectangular cross-section.

Figure 3:
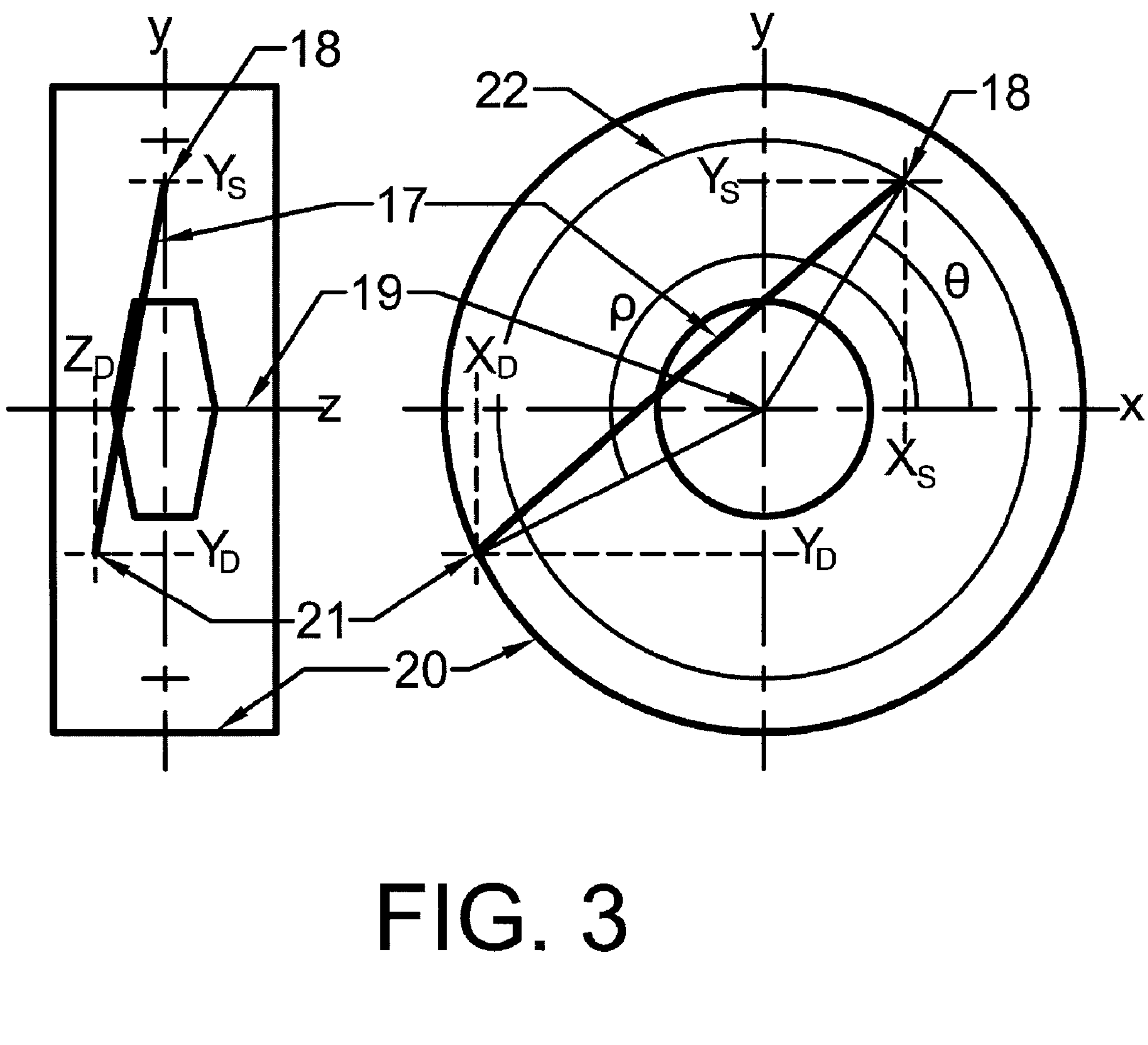
FIG. 3 is a pair of schematic views of a cone-beam CT scanner showing the location of a single ray.

FIG. 3 is similar to FIG. 2 except that it shows the location of a single arbitrary ray 17 that goes from the source 18 to the detector element 21. The array of detector elements 20 is outside of the path 22 of the source 18. The source 18 is at an angle of □ with respect to the x-axis of the coordinate system fixed in the object. The line from the axis 19 to the detector element 21 makes an angle □ with respect to the x-z plane. Note that this angle is with respect to the x-z plane and not the x-axis. The source 18 is located at $(X_S,Y_S,0)$ and the detector 21 is located at $(X_D,Y_D,Z_D)$.

In order to get a feeling for how F-space is populated using this geometry, consider the following: If, in FIG. 3, the source were located at the top on the y-axis and a 3 by 3 cone-beam were used, the F-component planes to be added into F-space would be oriented as shown in FIG. 1*b*. Then, as the source moves to another location on its path, for example, clockwise toward the x-axis, the cone-beam shown in FIG. 1*a* would rotate in the same way and the F-components shown in FIG. 1*b*, staying at right angles to their corresponding rays, would also rotate the same amount clockwise around the w-axis. In this way, F-space becomes populated after the source rotates through roughly 180 degrees.

Using D for the projection onto the x-y plane of the distance from the origin to the detector and using S for the distance from the origin to the source and using the locations given in FIG. 3 for the source and detector, then for a given ray we can write

| | | |
|---|---|---|
| $X_D = D\cos\rho$ | $Y_D = D\sin\rho$ | $Z_D = Z_D$ |
| $X_S = S\cos\theta$ | $Y_S = S\sin\theta$ | $Z_S = 0$ |

Substituting these equations into the equation derived above for the location of the F-component plane gives the location of the corresponding plane in F-space as $$(D \cos \rho - S \cos \theta)u + (D \sin \rho - S \sin \theta)v + Z_D w = 0$$

This equation says the following: The location of the F-component plane depends upon the locations of both the source and detector. The orientation of the F-component plane is perpendicular to the corresponding ray. The F-component plane goes through the origin of F-space.

Using the same substitutions, the modulation function derived above becomes $$F(u, v, W) = A \exp[iS(u \cos \theta + v \sin \theta)]$$

As expected, all of the F-components for a given source location, and thus for all of the rays in a given cone, have this same modulation function although the amplitude for each F-component depends upon the corresponding ray's measured amplitude, A. Also notice that for the specific geometry of this embodiment, S is constant for all source locations. Thus for this embodiment, the modulation function depends only on the angular location of the source.

The points on each F-component plane are equally spaced and each such point is added into the nearest F-space array "cell". This is done even if it means two or more such points go into the same cell. This is the "stuffing" process. It is necessary because both the F-component plane and the F-space array have regularly spaced points and the planes are tilted in F-space. Any adverse effect of stuffing on the final image can be reduced by using more points in F-space with shorter spacing, by interpolation, or by other methods.

The attenuation data is collected for each source location around either 180 or 360 degrees. If 180 degrees is used, in order to minimize artifacts, the source has to go through more than 180 degrees so that every ray in the cone goes through the same 180 degrees. This means the source has to travel through more than 180 degrees. When it does, some rays at the start and finish will effectively overlap. These overlapping rays have to be averaged in or not used. As with any CT system, higher spatial resolution requires more source locations. Not only does each point in the central volume get hit by a ray from every source location, each point in the central volume gets hit by a ray from every angle throughout the same 180 degrees.

Because all F-component planes go through the origin of F-space, the density near the origin is higher than away from the origin. Since the data is added in, increased density has the effect of an increase in amplitude. Thus the non-uniform data density can be corrected by multiplying by t, the distance from the w axis.

The data in F-space, after the above steps, is the Fourier transform of the distribution of the property of the object. The distribution, or image, is obtained by taking the three-dimensional inverse Fourier transform of the data in F-space. This process is the same as that used for Fourier reconstruction methods and the same sort of data modification can be done before the inverse transform is taken. An example of such a modification would be to reduce further the amplitudes near the origin in order to enhance the edges in the final image. Another example would be to reduce the amplitudes at the edges in F-space in order to minimize high-spatial-frequency ringing in the final image. The usual Fourier transformation techniques are used to select the desired slice locations and slice thicknesses.

Accordingly, the present invention is not limited to the embodiment described herein, but is instead defined in the following claims.

What is claimed is:

1. A method of obtaining an image of the distribution of an internal property of an object by recording and processing the intensities of multiple rays that have passed through said object and have been attenuated by said property, said method comprising the steps of:

irradiating the object with one or more rays of energy from one or more localized energy sources with the rays going through the object to one or more detectors and recording the detected intensity of each ray;

acquiring said intensity or intensities multiple times with differing locations of the rays through the object;

creating for each ray a first array of numbers said numbers having a periodic modulation across the array with the amplitude of the modulation being determined by the intensity of the ray and with the frequency and direction of the modulation being determined by the location of the ray in the object;

adding each first array of numbers as a line or plane into a second array of numbers said second array having one more dimension than the first array with the location of the line or plane in the second array determined by the location of the ray in the object;

adjusting the numbers in the second array to correct for the non-uniform density of data in the second array; and performing a Fourier transform on the numbers in the second array thereby generating an image of the distribution of the property of the object.

2. A method according to claim 1, in which the adjustment of the numbers to correct for the non-uniform density of data is performed on the numbers in the first array.

3. A method according to claim 1, in which an adjustment is made to the amplitude of the modulation based on the length, width, or other geometric property of each ray.

4. A method according to claim 1, in which at least one first array is added into the second array before all of the ray intensities have been obtained from the object.

5. A method according to claim 1, in which the data to be added into the second array is calculated directly from the ray intensities without creating a first array.

6. A method according to claim 1, in which the data to be added into the final image is calculated directly from the ray intensities without creating a first or second array.

7. A method of obtaining an image of the distribution of an internal property of an object by recording and processing multiple projections of the distribution, said method comprising the steps of:

acquiring a projection of said distribution by irradiating the object with multiple rays of energy from a localized energy source with the rays going through the object to multiple energy detectors and recording the attenuation of the rays caused by said property;

acquiring said projection multiple times with differing locations of the rays through the object;

creating for each ray a two-dimensional array of numbers said numbers having a periodic modulation across the array with the amplitude of the modulation being determined by the attenuation of the ray and with the frequency and direction of the modulation being determined by the location of the ray in the object;

adding each said two-dimensional array of numbers as a plane into a three-dimensional array of numbers with the location of the plane in the three-dimensional array determined by the location of the ray in the object;

adjusting the numbers in the said three-dimensional array to correct for the non-uniform density of data in the three-dimensional array; and performing a Fourier transform on the numbers in the three-dimensional array thereby generating an image of the distribution of the property of the object.

8. A method according to claim 7, in which the adjustment of the numbers to correct for the non-uniform density of data in the three-dimensional array is performed on the numbers in the two-dimensional arrays.

9. A method according to claim 7, in which an adjustment is made to the amplitude of the modulation based on the length, width, or other geometric property of the ray.

10. A method according to claim 7, in which the two-dimensional arrays for a single source location are created and added into the three-dimensional array before the attenuation values are obtained from at least one other source location.

11. A method according to claim 7, in which the data to be added into the three-dimensional array is calculated directly from the ray intensities without creating a two-dimensional array.

12. A method according to claim 7, in which the data to be added into the final image is calculated directly from the ray intensities without creating a two-dimensional array or a three-dimensional array.

13. A method of obtaining an image of the distribution of an internal property within a slice of an object by recording and processing multiple projections of said distribution within the slice, said method comprising the steps of:

acquiring a projection of said distribution within the slice by irradiating the slice with multiple rays of energy within the plane of the slice from a localized energy source with the rays going through the object to multiple energy detectors and recording the attenuation of the rays caused by said property;

acquiring said projection multiple times with differing locations of the rays through the slice;

creating for each ray a one-dimensional array of numbers said numbers having a periodic modulation across the array with the amplitude of the modulation being determined by the attenuation of the ray and with the frequency of the modulation being determined by the location of the ray in the object;

adding each said one-dimensional array of numbers as a line into a two-dimensional array of numbers with the location of the line in the two-dimensional array determined by the location of the ray in the object;

adjusting the numbers is said two-dimensional array to correct for the non-uniform density of data in the two-dimensional array; and performing a Fourier transform on the numbers in the two-dimensional array thereby generating an image of the distribution of the property within the slice of the object.

14. A method according to claim 13, in which the adjustment of the numbers to correct for the non-uniform density of data in the two-dimensional array is performed on the numbers in the one-dimensional arrays.

15. A method according to claim 13, in which an adjustment is made to the amplitude of the modulation based on the length, width, or other geometric property of the ray.

16. A method according to claim 13, in which the one-dimensional arrays for a single source location are created and added into the two-dimensional array before the attenuation values are obtained from at least one other source location.

17. A method according to claim 13, in which the data to be added into the two-dimensional array is calculated directly from the ray intensities without creating a one-dimensional array.

18. A method according to claim 13, in which the data to be added into the final image is calculated directly from the ray intensities without creating a one-dimensional array or a two-dimensional array.

19. Apparatus for obtaining an image of the distribution of an internal property of an object by recording and processing the intensities of multiple rays that have passed through said object and have been attenuated by said property, said apparatus comprising:

a means for applying multiple rays of energy to the object in known locations relative to the object from a localized source of energy and for detecting the intensity of each ray;

a means of changing the either the location of the source or the location of the detectors or both relative to the object;

a means of calculating the F-component of each ray;

a digital storage means for the F-space array and a means of adding the F-component of each ray into said storage means;

a means of adjusting the amplitude of the numbers in the F-space array according to their position in the array;

a means of performing an inverse Fourier transform on the F-space data; and a means of displaying and recording the resulting image.

20. Apparatus according to claim 19, wherein the means for calculating the F-component is optimized for the specific geometry of the system.

21. Apparatus according to claim 19, wherein the means for adding the F-component of each ray into said storage means is optimized for the specific geometry of the system.

* * * * *